United States Patent [19]

Jahan et al.

[11] 4,138,855
[45] Feb. 13, 1979

[54] TRANSFERRING HEAT FROM RELATIVELY COLD TO RELATIVELY HOT LOCATIONS

[75] Inventors: Christian C. Jahan, Bois Guillaume; Jacques Bouvin, Gremichon par Saint Martin du Vivier, both of France

[73] Assignee: Exxon Research & Engineering Co., Florham Park, N.J.

[21] Appl. No.: 807,970

[22] Filed: Jun. 20, 1977

[30] Foreign Application Priority Data

Jun. 25, 1976 [GB] United Kingdom ............... 26523/76
Sep. 24, 1976 [GB] United Kingdom ............... 39759/76

[51] Int. Cl.² .......................................... F25B 15/00
[52] U.S. Cl. ...................................... 62/112; 62/476
[58] Field of Search .................. 62/101, 107, 112, 476

[56] References Cited

U.S. PATENT DOCUMENTS

| | | | |
|---|---|---|---|
| 1,886,243 | 11/1932 | Gordon | 62/107 |
| 2,408,802 | 10/1946 | Miller et al. | 62/107 |
| 2,548,921 | 4/1951 | Von Platen | 62/107 |

Primary Examiner—Louis J. Casaregola
Attorney, Agent, or Firm—Joseph J. Dvorak

[57] ABSTRACT

Heat is transferred from a cold heat source to a hot heat sink by an absorption type heat pump wherein the working fluid and the absorbent liquid are capable of forming a solution having a lower critical solution temperature $t_c$. The working fluid at a low pressure extracts heat from the cold source and is reabsorbed in the absorbent liquid to form a solution which, at a higher pressure, is heated above $t_c$ to separate the working fluid from the solution. The heat requirement for this separation is less than that for distillation in prior heat pumps.

16 Claims, 9 Drawing Figures

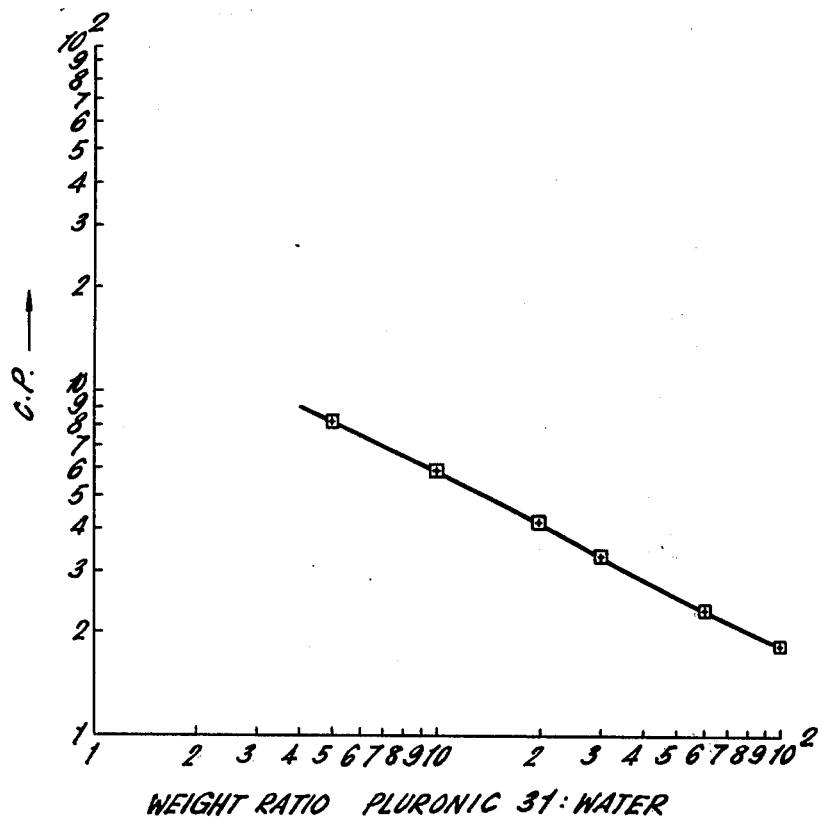

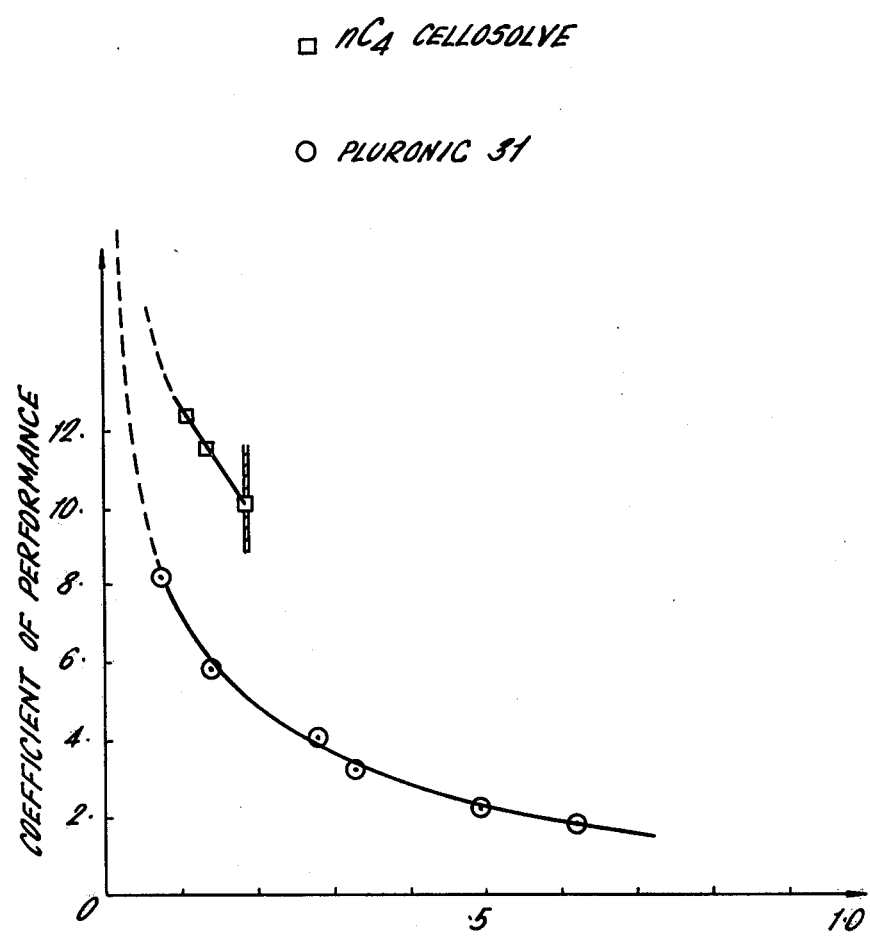

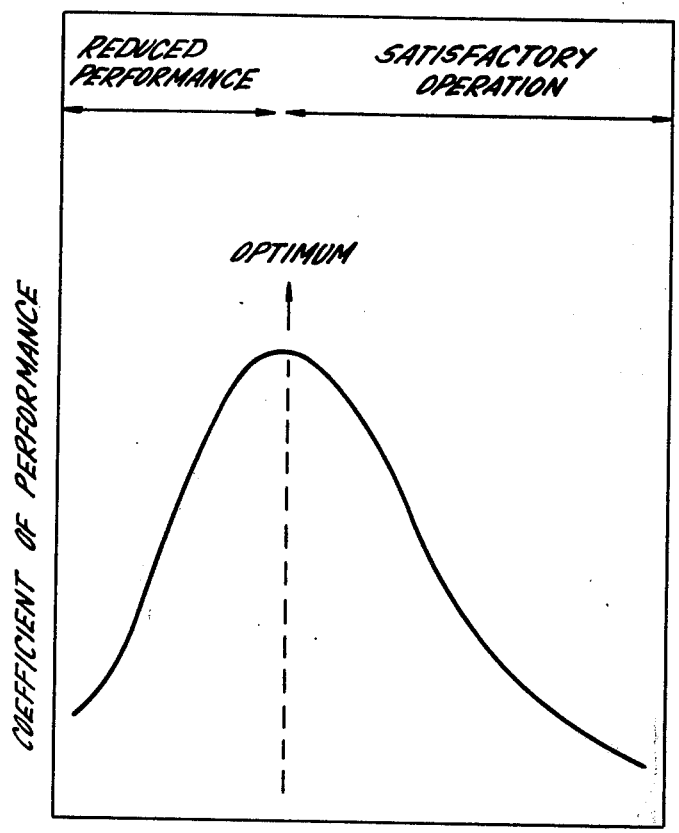

TRANSFERRING HEAT FROM RELATIVELY COLD TO RELATIVELY HOT LOCATIONS

The present invention relates to transferring heat between relatively cold and hot locations.

In this specification, the relatively hot location will be termed the hot heat sink or hot heat source, and the relatively cold location the cold heat source.

The transfer of heat from a cold source to a hot source is well known in the fields of refrigeration of the cold source and heating of the hot source by so-called heat pumps. The commonest types of refrigeration and heat pump equipment are of two well-known types, viz (i) the mechanical compression type in which a working fluid in the vapour phase is mechanically compressed and heat exchanged against the hot heat source to discharge heat thereto with possible liquefaction of at least some working fluid, and then expanded to a lower pressure and heat exchanged against the cold heat source with vapourization of liquid working fluid to extract heat therefrom, the vapour phase working fluid then being recovered and mechanically compressed for further use, and (ii) an absorption type in which a solution of a working fluid in an absorbent liquid is heated to produce hot vapour phase working fluid at a pressure below its critical pressure and hot absorbent liquid which is impoverished in working fluid, the vapour phase working fluid being heat exchanged against the hot heat source to discharge heat thereto so that the working fluid liquefies, expanding the liquid working fluid to a lower pressure and heat exchanging the expanded working fluid against the cold heat source to extract heat therefrom, and contacting the expanded working fluid with cooled, impoverished absorbent liquid to form a solution of working fluid in the absorbent liquid, and re-using the solution.

The efficiency of equipment for transferring heat between a cold heat source and a hot heat source is usually judged by its coefficient of performance (C.P.) which is the ratio of the heating effect produced to the energy supplied, both expressed in the same units. The C.P. must be greater than unity if heat is transferred between the relatively hot and cold locations. In the case where the working fluid is mechanically compressed, a C.P. exceeding 1.5 may be obtained.

In the case where the working fluid is separated under pressure by heating a solution of the working fluid in an absorbent liquid, C.P's have heretofore been no higher than 1.5 or thereabouts because a significant proportion of the heat supplied is used to ensure efficient separation of the hot working fluid from the absorbent liquid by distillation techniques.

It is an object of this invention to provide a method of, and equipment for, transferring heat from a cold heat source to a hot heat source by means of an improved heat pump or refrigerator of the absorption type.

According to one aspect of this invention, there is employed a combination of a working fluid and an absorbent liquid which are so selected that in the range of thermodynamic conditions encountered, the combination has a lower critical solution temperature ($t_c$) at, and below which, the absorbent liquid is capable of forming a liquid solution of the working fluid but above which the absorbent liquid and working fluid separate from such a solution into absorbent liquid-rich and working fluid-rich phases, and heat is transferred from a cold heat source at a temperature $T_c$ to a hot heat source or heat sink at a temperature $T_s$ by passing "rich" working fluid (i.e., working fluid mixed with no more than a minor proportion of any other fluid) under a first pressure ($p_1$) and at a first temperature ($t_1$) in a first heat exchange step in heat exchange relationship with the cold source of heat at a second pressure ($p_2$) lower than the first pressure ($p_1$) and at a second temperature ($t_2$) lower than the first temperature ($t_1$) and lower than the temperature $T_c$ of the cold source of heat, thereby extracting heat from the cold heat source, mixing the fluid in a mixing step, at a mixing pressure ($p_m$) and at a mixing temperature ($t_m$) not exceeding the lower critical solution temperature ($t_c$), with absorbent-rich liquid, rich in absorbent liquid, which at the mixing pressure ($p_m$) forms a liquid solution of the working fluid in the absorbent liquid substantially at the mixing temperature ($t_m$) and mixing pressure ($p_m$), and passing the liquid solution substantially at the mixing temperature ($t_m$), but substantially at the first pressure ($p_1$) in a second heat exchange step in heat exchange relationship with a source of heat to heat the solution to a third temperature ($t_3$) exceeding the temperature $T_s$ and also exceeding the critical solution temperature ($t_c$) whereby the solution separates into a first phase which is rich in working fluid and a second phase which is rich in absorbent liquid at a temperature greater than $T_s$, separately recovering rich working fluid and absorbent-rich liquid from the two phases, passing recovered rich working fluid in a third heat exchange step in heat exchange relationship with the hot heat source or heat sink at the temperature $T_s$ thereby transferring heat to the heat sink and reducing the temperature of the rich working fluid substantially to the first temperature ($t_1$), then passing the rich working fluid substantially at the first temperature ($t_1$) and first pressure ($p_1$) to the first heat exchange step, and passing recovered absorbent-rich liquid to the mixing step.

Because the separation of the solution of the working fluid in absorbent liquid into the first working fluid-rich phase and second absorbent-rich phase may take place merely by heating the solution, the heat input to effect this separation will be relatively small as compared to that required in prior systems using conventional distillation, and accordingly, the coefficient of performance of systems embodying the invention will be relatively high.

In another aspect, the present invention comprises apparatus for transferring heat from a relatively cold heat source at a temperature $T_c$ to a relatively hot heat sink at a temperature $T_s$ wherein $T_s$ exceeds $T_c$, and adapted for employing a combination of a working fluid and an absorbent liquid which are so selected that within the range of thermodynamic conditions encountered in the apparatus, the said combination is capable of forming a solution having a lower critical solution temperature $t_c$, the apparatus comprising a conduit for conducting rich working fluid under a first pressure $p_1$ and at a first pressure $t_1$ to a first heat exchange means adapted for being in heat exchange relationship with the cold heat source via expansion means permitting expansion of the working fluid to a second pressure $p_2$ lower than $p_1$ and a second temperature $t_2$ lower than $t_1$ and lower than $T_c$ for extracting heat from the cold heat source, a conduit for the passage of working fluid from the first heat exchange means to mixing means operative for mixing the working fluid at a mixing pressure $p_m$ and mixing temperature $t_m$ not exceeding $t_c$ with a liquid rich in absorbent liquid whereby to form a solution of working fluid in absorbent liquid, means for recovering said solution, means for causing the solution to pass at substantially the pressure $p_1$ exceeding $p_m$ and substantially at the mixing temperature $t_m$ to a second heat exchange means adapted for being in heat exchange relationship with a source of heat operative to raise the temperature of the solution to a temperature $t_3$ which is greater than $T_s$ and greater than $t_c$, separating means connected for receiving the solution from the second heat exchange means for permitting and/or facilitating the separation of rich working fluid from the solution, means for recovering absorbent liquid, depleted in working fluid, and for circulating said liquid to said mixing means for forming a further quantity of a solution of working fluid in absorbent liquid, means for conducting separated working fluid to pass to third heat exchange means adapted for being in heat exchange relationship with the hot heat sink whereby to furnish heat thereto, and means for conducting working fluid from said third heat exchange means substantially at said pressure $p_1$ and temperature $t_1$ for re-use in transferring further quantities of heat.

The lower critical solution temperature $t_c$ will depend on the nature of the working fluid and absorbent liquid, the relative concentrations of the working fluid and absorbent liquid, and on the pressure.

Preferably, the relative concentrations of working fluid and absorbent liquid at the mixing step are so chosen that the best separation of working fluid is obtained when the resulting solution is subsequently heated to the temperature $t_3$.

The cold source may be any convenient extensive body, such as the atmosphere or, more preferably, a body of water such as a river, sea or lake, to reduce the amount of heat exchange surface necessary to provide the required heat input at the cold source. In the temperate zones of northern Europe, the temperature of such cold sources will be generally in the range 8° to 15° C., with possible seasonal variations outside this range, and depending on the cold source, the working fluid and absorbent liquid, their relative concentrations in the second heat exchange step are preferably so selected that the temperature of the hot source need be only relatively slightly higher (e.g. 10° to 15° C.) than $t_c$ for domestic heating uses.

Preferably, there is employed a combination of a working fluid and an absorbent liquid which form a solution at the LCST and below, for at least some relative amounts of the working fluid and absorbent liquid, and which separate into a substantially pure working fluid phase when the temperature of the solution is raised above the LCST.

The working fluid may have a relatively high specific heat and/or latent heat of vapourization. For many uses, water may be employed as the working fluid as it has both a high specific heat and a high latent heat of vapourization, and is cheap and readily available.

The absorbent liquid may be any which is chemically stable over the operating temperature range to which it is subjected during the heat transfer operation. Specific types are glycol ethers and liquid condensation products of alkylene oxides with glycols.

The absorbent liquid may comprise one or more absorbent liquid components such that the LCST is higher than the temperature of the cold source.

In order to reduce the power for circulating absorbent liquid between the stage in which it absorbs working fluid and the stage in which it separates from working fluid, it is preferred that the viscosity of the absorbent fluid be relatively low. In many instances, a low molecular weight absorbent liquid will give a low viscosity.

The combination of working fluid and absorbent liquid is preferably so selected that at temperatures exceeding the LCST, separation of working fluid from solutions of working fluid and absorbent liquid take place relatively rapidly.

Similarly, it is preferred that the absorption of the working fluid in the absorbent liquid should take place relatively rapidly at the absorption temperatures; a suitable choice of component(s) of the absorbent liquid and of the working fluid will ensure this.

The solution of working fluid and absorbent liquid should be such that substantially no foaming occurs, particularly during the separation of working fluid from the absorbent liquid.

After the separation of working fluid from the absorbent liquid, e.g., by decantation or passage over a weir, the absorbent liquid should preferably contain no more than a minor proportion of the working fluid and the working fluid should preferably contain substantially no absorbent liquid, or only a very minor proportion thereof.

The range of relative concentrations of working fluid and absorbent liquid giving LCST properties with a desired operating temperature range may be extended by providing in the solution of working fluid and absorbent liquid, or in the latter, an additive which is soluble or partly soluble in both the working fluid and the absorbent liquid. When such an additive is so provided, the amount of absorbent liquid may be reduced since it is then possible to form a solution of the working fluid at a higher concentration of the latter relative to the absorbent liquid. In embodiments wherein the working fluid is water and the absorbent liquid is a glycol ether or polyoxyalkyleneglycol or polyoxyalkylenepolyglycol ether, suitable non-limitative examples of additives are sodium alkyl sulphates, where the alkyl group is butyl, octyl or dodecyl, for example, and para-chlorobenzene sodium sulphonate. Such additives are preferably provided in relatively low concentrations (e.g., 0.1 to 1.0 wt.%, based on the absorbent liquid).

Examples of other suitable combinations or working fluids, W, absorbent liquids A and their minimum lower critical solution temperatures, $t_c$, are given in the following table:

| Combination No. | Absorbent Liquid (A) | Molecular Weight | Working Fluid (W) | Minimum $t_c$ (° C.) |
|---|---|---|---|---|
| 1 | Polyisobutylene | $4.7 \times 10^2$ | propane | 85 |
| 2 | " | $4.7 \times 10^2$ | isobutane | 114 |
| 3 | " | $1.6 \times 10^6$ | n-pentane | 75 |
| 4 | " | | | |
| 5 | " | $\infty$ | n-pentane | 71 |
| 6 | " | $1.6 \times 10^6$ | isopentane | 54 |
| 7 | " | $6.2 \times 10^4$ | isopentane | 71 |
| | | $\overline{M}w$ | | |
| 8 | " | $2.3 \times 10^6$ | isopentane | 52 |

-continued

| Combination No. | Absorbent Liquid (A) | | Molecular Weight | Working Fluid (W) | Minimum $t_c$ (° C) |
|---|---|---|---|---|---|
| 9 | " | | $\infty$ | isopentane | 45 |
| 10 | " | | $1.6 \times 10^6$ | cyclopentane | 71 |
| 11 | " | | | cyclopentane | 188 |
| 12 | " | | $1.6 \times 10^6$ | n-hexane | 128 |
| 13 | " | | $1.6 \times 10^6$ | n-hexane | 129 |
| | | | | 2,2-dimethyl-butane | 103 |
| 14 | " | | $1.6 \times 10^6$ | 2,3-dimethyl-butane | 131 |
| 15 | " | | $\infty$ | 2-methylpentane | 103 |
| 16 | " | | $\infty$ | 3-methylpentane | 132 |
| 17 | " | | $\infty$ | methylcyclopentane | 205 |
| 18 | " | | $\infty$ | cyclohexane | 243 |
| 19 | " | | $1.6 \times 10^6$ | cyclohexane | 139 |
| 20 | " | | $1.6 \times 10^6$ | n-heptane | 168 |
| 21 | " | | $\infty$ | n-heptane | 169 |
| 22 | " | | $\infty$ | 2-methylhexane | 153 |
| 23 | " | | $\infty$ | 3-methylhexane | 173 |
| 24 | " | | $\infty$ | 3-ethylpentane | 185 |
| 25 | " | | $\infty$ | 2,2-dimethylpentane | 131 |
| 26 | " | | $\infty$ | 2,3-dimethylpentane | 178 |
| 27 | " | | $\infty$ | 2,4-dimethylpentane | 130 |
| 28 | " | | $\infty$ | 3,3-dimethylpentane | 176 |
| 29 | " | | $\infty$ | 2,2,3-trimethylbutane | 172 |
| 30 | " | | $\infty$ | ethylcyclopentane | 251 |
| 31 | " | | $\infty$ | methylcyclohexane | 253 |
| 32 | " | | $\infty$ | cycloheptane | 299 |
| 33 | " | | $\infty$ | n-octane | 204 |
| 34 | " | | $1.6 \times 10^6$ | n-octane | 180 |
| 35 | " | | $\infty$ | 2-methylheptane | 193 |
| 36 | " | | $\infty$ | 3-methylheptane | 205 |
| 37 | " | | $\infty$ | 2,2-dimethylhexane | 181 |
| 38 | " | | $\infty$ | 2,4-dimethylhexane | 185 |
| 39 | " | | $\infty$ | 2,5-dimethylhexane | 173 |
| 40 | " | | $\infty$ | 3,4-dimethylhexane | 224 |
| 41 | " | | $\infty$ | 2,2,4-trimethylpentane | 162 |
| 42 | " | | $\infty$ | n-propylcyclopentane | 274 |
| 43 | " | | $\infty$ | cyclooctane | 364 |
| 44 | " | | $\infty$ | n-decane | 262 |
| 45 | " | | $\infty$ | n-dodecane | 309 |
| 46 | Polystyrene | | $1.3 \times 10^6$ | cyclopentane | 150 |
| 47 | " | | $2.5 \times 10^5$ | cyclopentane | 164 |
| 48 | " | | $8.9 \times 10^4$ | cyclopentane | 172 |
| 49 | " | | $4.3 \times 10^4$ | cyclopentane | 178 |
| 50 | " | | $9.5 \times 10^4$ | methyl acetate | 132 |
| 51 | " | | $5.5 \times 10^4$ | methyl acetate | 150 |
| 52 | " | $\overline{M}n$ | $5.9 \times 10^4$ | methyl acetate | 154 |
| 53 | " | | $4.8 \times 10^4$ | methyl acetate | 155 |
| 54 | Polybutadiene | | $1.5–3.0 \times 10^5$ | n-hexane | 145 |
| 55 | " | | $1.5–3.0 \times 10^5$ | toluene | 300 |
| 56 | " | | $1.5–3.0 \times 10^5$ | benzene | 270 |
| 57 | Polyethylene | | $10^6$ ? | n-hexane | 127 |
| 58 | " | | $10^6$ ? | cyclohexane | 163 |
| 59 | Polypropylene | | $1.7 \times 10^4$ | n-pentane | 152 |
| 60 | " | | $1.8 \times 10^6$ | n-pentane | 105 |
| 61 | " | | $\geq 2 \times 10^6$ | n-pentane | 136 |
| 62 | " | $(\overline{M}n)$ | $1.1 \times 10^4$ | n-pentane | 172 |
| 63 | " | | $3.7 \times 10^4$ | n-pentane | 157 |
| 64 | " | | $9.7 \times 10^4$ | n-pentane | 153 |
| 65 | " | | $1.2 \times 10^5$ | n-pentane | 152 |
| 66 | " | | $4.9 \times 10^3$ | n-pentane | 149 |
| 67 | " | | $3.1 \times 10^3$ | n-pentane | 177 |
| 68 | " | | $4.5 \times 10^3$ | n-pentane | 175 |
| 69 | " | | $1.2 \times 10^4$ | n-pentane | 163 |
| 70 | " | | $5.2 \times 10^4$ | n-pentane | 154 |
| 71 | Polybutene-1 | | $1.8 \times 10^5$ | n-pentane | 153 |
| 72 | " | | $5.0 \times 10^5$ | n-pentane | 151 |
| 73 | " | $(\overline{M}w)$ | $1.2 \times 10^5$ | n-pentane | 153 |
| 74 | " | | $2.3 \times 10^6$ | n-pentane | 148 |
| 75 | Polyoctene-1 | | $2.5 \times 10^6$ | propane | 36 |
| 76 | " | | $2.5 \times 10^6$ | isobutane | 84 |
| 77 | " | $(\overline{M}w)$ | $2.5 \times 10^6$ | n-butane | 114 |
| 78 | " | | $2.5 \times 10^6$ | neopentane | 111 |
| 79 | " | | $2.5 \times 10^6$ | n-pentane | 166 |
| 80 | 2,3 dimethylpyridine | | — | water | 16.5 |
| 81 | 2,4 dimethylpyridine | | — | water | 23.4 |
| 82 | 2,5 dimethylpyridine | | — | water | 13.1 |
| 83 | 2,6 dimethylpyridine | | — | water | 34.0 |
| 84 | Ethyl-2 pyridine | | — | water | −2.0 |
| 85 | Ethylene glycol-n-butyl ether | | — | water | 49.1 |
| 86 | Ethylene glycol-isobutyl ether | | — | water | 24.5 |
| 87 | 1,2 propylene glycol-propyl ether | | — | water | 34.5 |
| 88 | 1,2 propylene glycol 2-propyl ether | | — | water | 42.6 |
| 89 | polycondensation product of ethylene oxide and poly-propyleneglycols* | | — | water | 25 to 100 |

*of the types of various molecular weight available under the trade name "EmKalyx - Pluronics".

Combinations 85 to 89 have the merit of being readily available at comparatively low cost. Of course, the list of combinations given above is by no means exhaustive.

The separation and recovety of the absorbent liquid and working fluid may be simply by overflow over a weir or by a decantation technique.

In some operations of the system of the invention, the heat content of one or both of the working fluid and of the absorbent liquid at the mixing step may be excessively high for the formation of a solution of working fluid in absorbent liquid, and it may then be necessary to reject heat from one or both of the working fluid and absorbent liquid so that a solution may be formed. Generally speaking, it will usually be more convenient to reject heat from the absorbent liquid than the working fluid. The heat rejection may be performed in a fourth heat exchange step wherein the absorbent liquid and/or the working fluid are passed in heat exchange relationship with a suitable heat sink which is at a temperature ($t_4$) lower than the temperature of the said recovered first and/or second phase. A suitable heat sink may comprise, at least in part, the solution of working fluid in absorbent liquid recovered from the mixing step. The heat sink may additionally or alternatively comprise the cold heat source at the temperature $T_c$ and/or the hot heat sink at the temperature $T_s$. Thus, for example, a heat exchange fluid may be passed in heat exchange with the absorbent liquid passing to the mixing step and/or with working fluid, the heat exchange fluid being circulated to the heat sink where heat is discarded or rejected. In one embodiment, heat exchange fluid may be passed in heat exchange relationship with the absorbent liquid passing to the mixing step, and the heat exchange fluid or a stream in parallel therewith passed in heat exchange relationship with the working fluid passing from the separation step, the heat exchange fluid stream(s) then being circulated for heat exchange with the heat sink at temperature $T_s$.

The circulation of the absorbent liquid may be by a pump or by thermosiphon or other convenient means or expedients. The working fluid may circulate under the influence of pressure differences between the pressure ($c.p_1$) at the first phase-recovery step and pressure ($p_m$) at the mixing step. The circulation of the absorbent liquid and working fluid may further be assisted by providing a "permanent" or non-condensible gas such as hydrogen in the circulation route of the working fluid.

The invention is now described in a non-limitative way with reference to the accompanying drawings, wherein the working fluid is designated A and the absorbent liquid is designated B, and in which:

FIG. 7 is a graph of C.P. versus weight ratio of Pluronic 31 to water showing the effect of operating an evaporater at different temperatures;

FIG. 8 shows calculated values of the C.P. for systems using A = water, B = either n-butyl-Cellosolve (commercial name for diethylene glycol monobutylether) or Pluronic 31; and FIG. 9 shows graphically the variation of C.P. with different ratios of A to B in the absorber.

Figure 1:
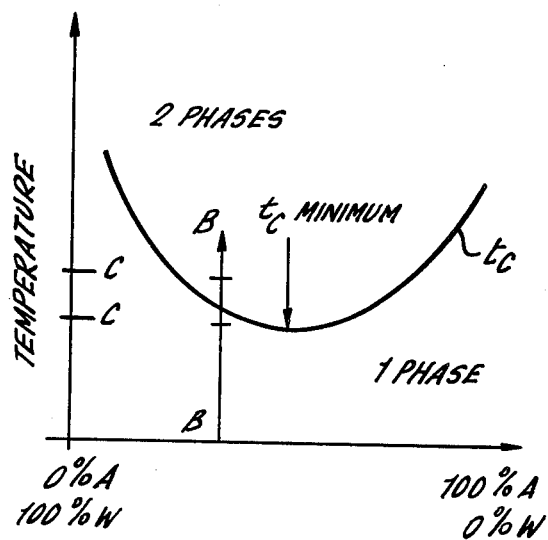
FIG. 1 shows an examplary graph of the variation of LCST with varying concentrations of A and B.

Reference is first made to FIG. 1.

FIG. 1 is a typical graph of lower critical solution temperatures $t_c$ at and below which the working fluid W and absorbent liquid A form a solution, the percentage concentrations of absorbent liquid A and working fluid W being depicted along the abscissa. The graph shows that for the selected combination of working fluid W and absorbent liquid A, $t_c$ has a minimum value for reasonable concentrations of working fluid. It will be appreciated that if the value of $t_c$ corresponding to a selected solution of W in A is slightly above the mixing temperature $t_m$, the amount of heat required to separate the solution into its two phases may be relatively low, so that the coefficient of performance of the system is relatively high. It is not necessary to operate at the minimum $t_c$ for the combinations exhibiting a minimum $t_c$ such as that depicted in FIG. 1. For example, it might be convenient to operate along the vertical line B—B over the temperature range C—C, in FIG. 1.

Figure 2:
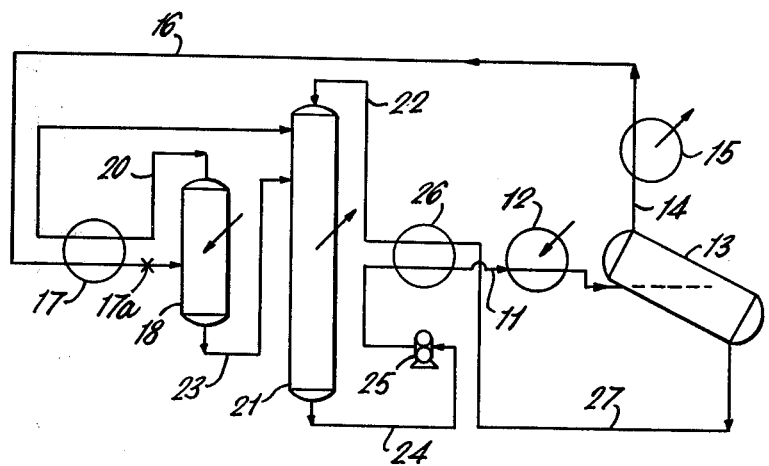
FIG. 2 is a diagrammatic flow sheet of a heat pump or refrigerator using the principle of the invention.

Reference is now made to FIG. 2.

A solution of the working fluid A in absorbent liquid B at a temperature slightly below the lower critical solution temperature $t_c$ is passed via line 11 to heat exchanger 12 wherein the solution is heated to a temperature at or above its lower critical solution temperature. The components of the solution pass to a separating or decantation vessel 13 wherein they form two phases. As depicted, the lower phase in vessel 3 is a liquid which is rich in B and the upper phase is rich in A. The A-rich phase circulates via line 14 to a heat exchanger 15 wherein it surrenders heat to a hot source or heat sink which is at a lower temperature than the A-rich phase, thereby providing heat at the hot heat source or sink and cooling the A-rich phase. The cooled A-rich phase passes via line 16 and a heat exchanger 17 and an expansion device 17a (e.g., an expansion valve and/or engine) wherein it expands to a lower pressure and its temperature falls considerably. The thus expanded A-rich phase is passed into a flash chamber 18 which is in heat exchange relationship with a cold heat source (e.g. river or sea-water) and heat is transferred from the cold heat source to the cold, expanded A. Any heavy contaminant (e.g. a contaminant comprising vapourized or entrained B) separates at the bottom of flash chamber 18. The expanded A is passed from chamber 18 via line 20 to the heat exchanger 17 wherein it is in heat transfer relationship with the A passing to the flash chamber 18, thereby reducing the temperature of the latter (and increasing its heat extraction from the cold heat source) and increasing the temperature of the expanded A leaving the heat exchanger 17. The thus warmed, expanded A circulates to the top region of an absorption tower 21 wherein it is contacted by a downward flow of B from line 22. Further down the tower 21, heavy contaminants which may have separated at the bottom of chamber 18 are introduced via line 23 substantially at their flash chamber temperature. The relative concentrations of A and B and their temperatures during contact in the tower 21 are so arranged that component A will form a solution in component B. Thus, the B stream may be passed in heat exchange relationship with a cooling fluid in a heat exchanger (not shown) immediately before it is passed into the tower 21. The cooling fluid may be employed to supply heat to the heat sink and may be combined in series or parallel with a cooling fluid stream in heat exchanger 15, the cooling fluid supplying heat to the heat sink. If the dissolution of A in B evolves heat which may inhibit the absorption of substantially all of A in B, tower 21 may be provided with any known suitable means (not shown) for removing heat from the interior thereof.

A solution of A in B is recovered via line 24 from the base of the tower 21, and circulated by a pump 25 back to line 11 for further use. As is shown, the solution is passed to line 11 via a heat exchanger 26 wherein it is in heat transfer relationship with B which is recovered from the base of separating vessel 13 via line 27. By this expedient, the temperature of B passing to the top of the absorption tower 21 via line 22 is reduced to a level at which the solution of A in B may be more readily formed in the tower 21, while the temperature of the solution of A in B passing to line 11 is raised to a temperature below the critical solution temperature.

The apparatus of FIG. 2 functions to transfer heat from the cold heat source in heat transfer relationship with the flash chamber 18 to the hot heat source in heat exchange relationship with heat exchanger 15. Accordingly, the apparatus may be employed as a refrigerator for the cold heat source or as a heat pump for heating the hot heat source, or for both functions. The "payload" of heat is the relatively small amount of heat input at heat exchanger 12 and since this, together with the energy input from the pump 25, represents a relatively small proportion of the heat transferred to the hot heat source or heat sink at heat exchanger 15, the coefficient of performance is relatively high.

The apparatus of FIG. 2 is, of course, not limitative as to the type of equipment by which the LCST phenomenon can be exploited for use in heat pumps or refrigeration equipment.

Figure 3:
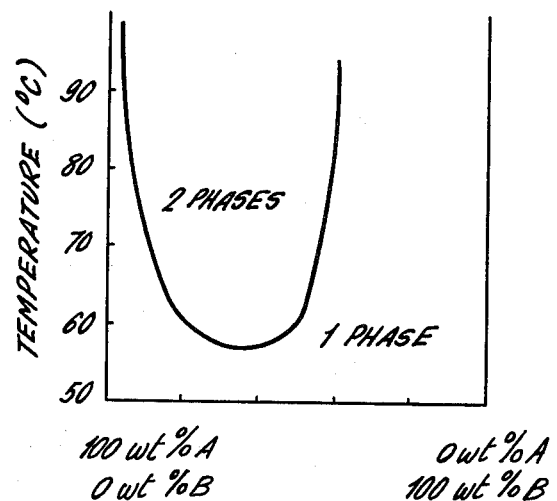
FIGS. 3 and 4 are graphs of the type shown in FIG. 1 but wherein A is water, and B is diethylene glycol monoethylether in FIG. 3, and the polycondensation product of ethylene oxide and propylene glycol available under the trade name "Pluronic 31" and having a molecular weight of about 1100 in FIG. 4.
Figure 4:
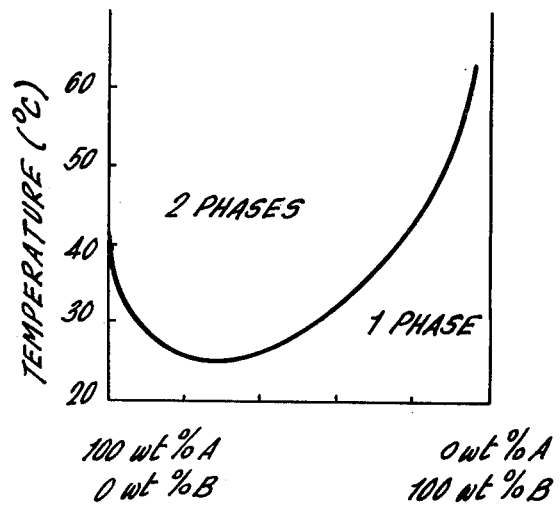

Reference is now made to FIGS. 3 and 4 from which will be seen the different LCST curves of the systems water/diethyethylene monobutylether (FIG. 3) and water/Pluronic 31 (FIG. 4). The latter system gives phase separation at lower temperatures and higher water concentrations than the former, which may be advantageous, other factors being equal, in that a small proportion of absorbent liquid is required with Pluronic 31 than with diethyleneglycol monobutylether. The "parabolic" curves of FIGS. 3 and 4 can be widened, and flattened at their minima so as to have a higher LCST, by the addition of a compound which is dissolved in both components of the system. Suitable compounds are butyl, octyl or dodecyl sodium sulphate and p-chlorobenzene sodium sulphonate. These and other suitable compounds can be employed to adjust or modify the LCST curves of other systems. Examples of absorbent liquids which can be used when water is the working fluid, together with their LCST with water are now given:

| | | | |
|---|---|---|---|
| 1. | Diethyleneglycol monoamylether | LCST = | 36° C |
| 2. | Diethyleneglycol monohexylethylether | " | 3° C |
| 3. | Propyleneglycol monopropylether | " | 32° C |
| 4. | Triethyleneglycol monohexylether | " | 37° C |
| 5. | Triethyleneglycol monooctylether | " | 10° C |
| 6. | Ethylbenzeglycol mono-n-butylether | " | 57° C |
| 7. | Tetraethyleneglycol monohexylether | " | 60° C |
| 8. | Tetraethyleneglycol monooctylether | " | 35° C |
| 9. | Pentaethylene monooctylether | " | 60° C |
| 10. | Pluronic L31 | " | 37° C |
| 11. | Pluronic L35 | " | 77° C |
| 12. | Pluronic L42 | " | 37° C |
| 13. | Pluronic P69 | " | 82° C |

Combinations of absorbent liquids, such as those given above, may be employed, to furnish systems having an LCST appropriate for the duties envisaged, and, if necessary, additives may be included in the absorbent liquid(s) to modify or adjust the LCST curves, as explained briefly above.

Figure 5:
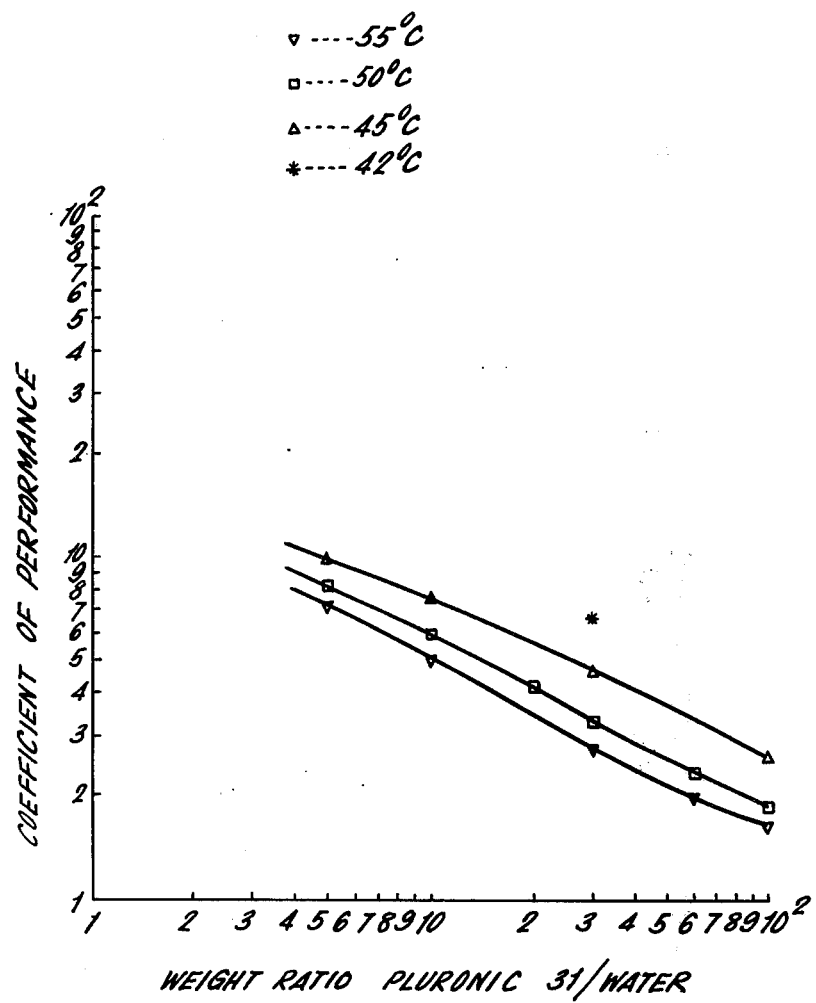
FIG. 5 shows graphically the variation of coefficient of performance ("C.P.") versus weight ratios of Pluronic 31: water for different temperatures of B on entering an absorber for absorbing A, as obtained by calculation.

In FIG. 5, the graphs were obtained by applying calculations to the absorber 21 of FIG. 2 with different temperatures of the absorbent liquid entering the top of the tower 21 from line 22. The calculations were based on an evaporator temperature of 10° C., an absorbent temperature of 40° C. on leaving the absorber 21 at line 24, and a temperature difference of 30° C. between the temperature of absorbent liquid leaving the separating or decantation vessel 13 and the temperature of absorbent liquid entering the top of the absorption tower 21, this temperature difference being correlated with the kinetics of the performance of the system. It will be seen that the C.P. improved as the weight ratio of Pluronic 31 to water decreased, and as the temperature of absorbent liquid entering the absorption tower decreased.

Figure 6:
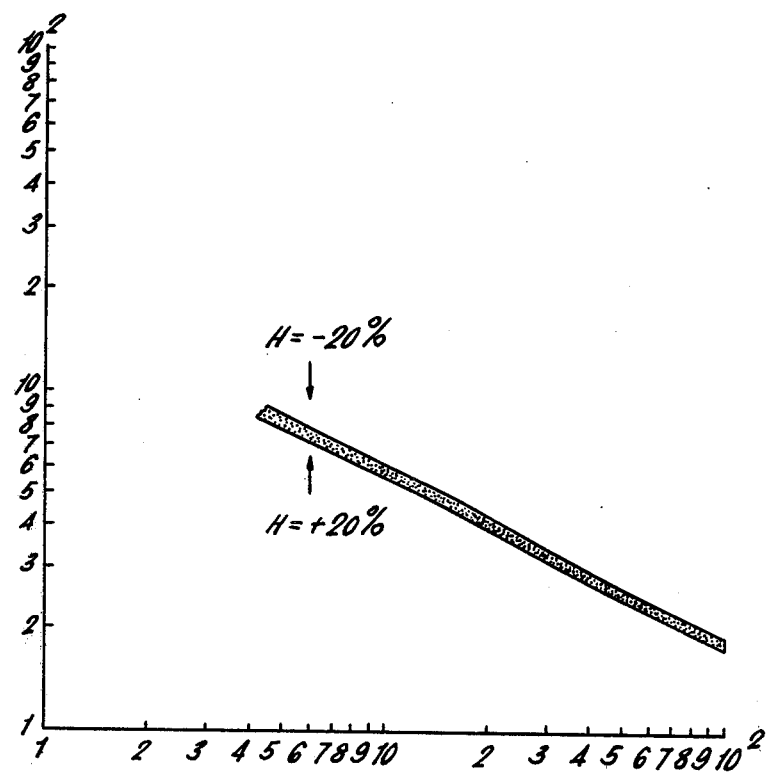
FIG. 6 depicts graphically calculated ranges of C.P. for a range of weight ratios of Pluronic 31:water assuming different heats of solution of water in Pluronic 31 in the absorber.

In FIG. 6, the C.P. (ordinate) is seen to increase as the weight ratio of Pluronic 31 to water decreases, as in FIG. 5. The upper and lower limits of the curves are based on assumptions that the heat of absorption of water in Pluronic 31 in the absorber 21 are respectively 20% less and 20% more than that found in laboratory experiments when the evaporator temperature is 10° C., the absorbent temperature leaving the absorber is 40° C., the temperature of absorbent liquid entering the absorber is 50° C., and the temperature difference between the absorbent liquid leaving the separator or decanter 13 and the absorbent liquid entering the top of the absorber 21 is 30° C. It will be seen that the influence of increases or decreases in the heat of solution of water in Pluronic 31 has only a small influence on the CP.

In FIG. 7, the temperature of the evaporator 18, effectively the temperature of the cold heat source, is shown to have no detectable influence on performance, at least for evaporator temperature of 10° C. and 15° C. The other operating conditions are as for FIG. 6.

FIG. 8 shows some estimated/calculated C.P.'s for nC$_4$-Cellosolve/water and Pluronic 31/water. The regimes were investigated at temperatures which, in the case of nC$_4$-Cellosolve/water, produce complete solubility at values of about 0.2 and over. It will be seen that the higher C.P.'s are obtainable when the proportion of water is reduced.

While the graphs of FIGS. 5, 6, 7 and 8 demonstrate the improved coefficient of performance obtained by employing a high ratio of working fluid to absorbent liquid, a limiting factor can be the absorption of the working fluid in the absorber 18, as qualitatively shown in FIG. 9. When the ratio of working fluid to absorbent liquid is low, a relatively low C.P. is obtained, and the C.P. is improved as the ratio increases. However, with a given absorber 18 and at least some fixed operating conditions, an excessive amount of working fluid cannot be absorbed to form a solution with the absorbent liquid, and the C.P. then is reduced. If the amount of working fluid is further increased, its dissolution in the absorber is reduced, at least relatively speaking, and the C.P. is also reduced. Accordingly, there tends to be an optimum value of the relative amounts of working fluid and absorbent liquid to obtain the highest C.P. from a particular heat pump or refrigeration system operating under particular conditions. Additives to modify the LCST characteristics may be useful in improving the C.P.

What we claim is:

1. A method of transferring heat from a relatively cold source of heat at a temperature $T_c$ to a relatively hot heat sink at a temperature $T_s$ wherein $T_s$ is greater than $T_c$ comprising:

providing a working fluid and an absorbent liquid selected to be capable of forming a solution having a lower critical solution temperature, $t_c$;

passing said working fluid under a first pressure $p_1$ and at a first temperature $t_1$ in a first heat exchange step in heat exchange relationship with the cold heat source at a second pressure $p_2$, and second temperature $t_2$ respectively lower than the first pressure $p_1$ and temperature $t_1$ and lower than the cold heat source temperature $T_c$ thereby extracting heat from said cold heat source;

recovering said working fluid from said first heat exchange step;

mixing said recovered working fluid in a mixing step and at a mixing pressure $p_m$ and a mixing temperature $t_m$ not exceeding $t_c$ with said absorbent liquid, thereby forming a liquid solution of the working fluid in the absorbent liquid substantially at the mixing temperature $t_m$ and mixing pressure $p_m$ and having a lower critical solution temperature, $t_c$;

passing the liquid solution substantially at the mixing temperature $t_m$ but substantially at the first pressure $p_1$ in a second heat exchange step in heat exchange relationship with a source of heat to raise the temperature of the solution to a third temperature $t_3$ exceeding temperature $T_s$ and also exceeding $t_c$ whereby to cause the solution to separate into a first liquid phase being substantially said working fluid and a second liquid phase being substantially said absorbent liquid at a temperature greater than $T_s$;

separately recovering said working fluid and said absorbent liquid from said first and second phase;

passing said recovered working fluid in a third heat exchange step in heat exchange relationship with the hot heat sink thereby transferring heat to the hot heat sink and reducing the temperature of the working fluid substantially to $t_1$;

passing the working fluid substantially at the first temperature $t_1$ and first pressure $p_1$ to the first heat exchange step; and passing recovered absorbent liquid to the mixing step to form said solution.

2. A method according to claim 1 in which the absorbent liquid is recovered by overflow over a weir.

3. A method according to claim 1 comprising: rejecting heat from at least one of the working fluid and the absorbent liquid at the mixing step whereby to facilitate the formation of a solution of working fluid in the absorbent liquid.

4. A method according to claim 3 in which said heat rejection is effected by passing at least one of the working fluid and the absorbent liquid in a fourth heat exchange step in heat exchange relationship with a heat sink which is at a temperature $t_4$ lower than the temperature of at least one of the resulting heat-depleted working fluid and the absorbent liquid.

5. A method according to claim 4 in which the said heat sink to which heat is rejected comprises, at least in part, a solution of working fluid in absorbent liquid recovered from the mixing step.

6. A method according to claim 4 in which the said heat sink comprises a heat rejection sink selected from at least one of the cold heat source and the hot heat sink.

7. A method according to claim 1 in which recovered solution from the mixing step is passed in heat exchange with said absorbent liquid whereby the solution is heated to a temperature between $t_m$ and $t_c$, and the absorbent liquid is cooled.

8. A method according to claim 1 in which working fluid substantially at the temperature $t_1$ and pressure $p_1$ is passed in heat exchange relationship with working fluid which has been recovered from the first heat exchange step whereby to heat the said recovered working fluid and to reduce the temperature of the working fluid passing to the first heat exchange step.

9. Apparatus for transferring heat from a relatively cold heat source at a temperature $T_c$ to a relatively hot heat sink at a temperature $T_s$ wherein $T_s$ exceeds $T_c$ comprising:

a working fluid and an absorbent liquid selected to be capable of forming a solution having a lower solution temperature, $t_c$;

a conduit for conducting said working fluid under a first pressure $p_1$ and at a first temperature $t_1$ to a first heat exchange means adapted for being in heat exchange relationship with the cold heat source via expansion means permitting expansion of the working fluid to a second pressure $p_2$ lower than $p_1$ and a second temperature $t_2$ lower than $t_1$ and lower than $T_c$ for extracting heat from the cold heat source;

a conduit for the passage of working fluid from the first heat exchange means to mixing means operative for mixing the working fluid at a mixing pressure $p_m$ and mixing temperature $t_m$ not exceeding the lower solution temperature $t_c$ of the solution capable of being formed by said working fluid and absorbent liquid whereby to form a solution of working fluid in absorbent fluid;

means for recovering said solution;

means for causing the solution to pass at substantially the pressure $p_1$ exceeding $p_m$ and substantially at the mixing temperature $t_m$ to second heat exchange means adapted for being in heat exchange relationship with a source of heat operative to raise the temperature of the solution to a temperature $t_3$ which is greater than $T_s$ and greater than $t_c$ thereby forming a first liquid phase and a second liquid phase;

liquid separating means connected for receiving the solution from the second heat exchange means for permitting the separation of said first liquid phase comprising working fluid from the second liquid phase comprising absorbent liquid;

means for recovering said absorbent liquid depleted in working fluid, and for circulating said liquid to said mixing means for forming a further quantity of a solution of working fluid in absorbent liquid;

means for conducting separated working fluid to pass to third heat exchange means adapted for being in heat exchange relationship with the hot heat sink whereby to furnish heat therefor, and means for conducting working fluid from said third heat exchange means substantially at said pressure $p_1$ and temperature $t_1$ for re-use in transferring further quantities of heat.

10. Apparatus according to claim 9 in which said separating means comprises an overflow weir means for the separation and recovery of absorbent liquid.

11. Apparatus according to claim 9 comprising a fourth heat exchange means for the passage of the solution at substantially the pressure $p_1$ and the temperature $t_m$ in heat exchange relationship with recovered depleted absorbent liquid whereby to cool the latter substantially to the mixing temperature $t_m$ and to heat the former to a temperature between $t_m$ and $t_c$.

12. Apparatus according to claim 9 comprising fifth heat exchange means for the passage of working fluid substantially at temperature $t_1$ and pressure $p_1$ in heat exchange relationship with working fluid passing from the first heat exchange means to said mixing means whereby to heat the latter and cool the former.

13. Apparatus according to claim 9 comprising a pump for circulating solution recovered from the mixing means substantially at the mixing pressure $p_m$ to the second heat exchange means substantially at the pressure $p_1$.

14. A method according to claim 1 in which the absorbent liquid is recovered by decantation.

15. Apparatus according to claim 9 in which said separating means comprises decantation means for the separation and recovery of absorbent liquid.

16. In an absorption refrigeration process wherein a working fluid is circulated through an evaporator to an absorber for absorption therein by an absorbent liquid and the working fluid in said absorbent liquid is subsequently heated and separated into a rich working fluid and an absorbent-rich liquid, the improvement comprising: employing a working fluid and an absorbent liquid which, within the range of thermodynamic conditions encountered in said absorber, are capable of forming a solution having a lower critical solution temperature, $t_c$, and subsequently heating said solution to a temperature above $t_c$ whereby said solution forms a first liquid phase comprising a rich working fluid and a second liquid phase comprising an absorbent-rich liquid.

* * * * *